United States Patent [19]
Williams et al.

[11] Patent Number: 5,424,724
[45] Date of Patent: Jun. 13, 1995

[54] METHOD AND APPARATUS FOR ENHANCED ELECTRONIC MAIL DISTRIBUTION

[75] Inventors: Marvin L. Williams, Lewisville, Tex.; Roselyn H.-C. Yun, Honolulu, Hi.

[73] Assignee: International Business Machines Corporation, Armonk, N.Y.

[21] Appl. No.: 675,848

[22] Filed: Mar. 27, 1991

[51] Int. Cl.[6] ............................................. H04Q 1/00
[52] U.S. Cl. ........................... 340/825.05; 340/825.03; 370/94.1
[58] Field of Search ........... 340/825.05, 825.5, 825.52, 340/825.03, 825.02; 370/94.1, 94.3; 364/900 MS File; 395/325

[56] References Cited

U.S. PATENT DOCUMENTS

| | | | |
|---|---|---|---|
| 4,677,588 | 6/1987 | Benjamin | 364/900 |
| 4,706,080 | 11/1987 | Sincoskie | 340/825.52 |
| 4,995,035 | 2/1991 | Cole | 340/825.5 |
| 5,088,032 | 2/1992 | Bosack | 370/94.1 |
| 5,113,393 | 5/1992 | Kam | 370/94.1 |

FOREIGN PATENT DOCUMENTS

0376869A2 7/1990 European Pat. Off. ..... H04L 12/54

OTHER PUBLICATIONS

Computer Networks and ISDN Systems, vol. 13, No. 3, 1987, pp. 195–200 D. Heagerty "Practical Experience with High Level Gateways for Mail Transfer".

The 8th Int'l. Conference on Distributed Computing Systems, Jun. 1988, pp. 402–409 "Designing Large Electronic Mail Systems", Wael Bahaa-El-Din Hilal et al.

International Switching Symposium, Mar. 1987, pp. 564–570 H. Kauffeldt "Meridian Information Services: Evolution Towards Networking".

*Primary Examiner*—Donald J. Yusko
*Assistant Examiner*—Brian Zimmerman
*Attorney, Agent, or Firm*—Jonathan E. Jobe; Andrew J. Dillon

[57] ABSTRACT

A method and apparatus for enhanced electronic mail distribution which permits expeditious distribution of electronic mail documents to multiple host systems and/or external networks via a single host agent. A distributed data processing system having multiple host systems and/or external networks permits electronic mail documents to be distributed from local networks to nodes within various host systems or networks by establishing a host agent reference table at selected host agents within the local network. Each host agent reference table includes an identification of selected destination nodes associated with an identified host agent for those nodes. A referral to the host agent reference table may then be utilized to determine the appropriate host agent for an electronic document destined for a selected node. Thereafter, existing interprocess local network communications may be utilized to communicate the electronic document to the appropriate host agent. In the depicted embodiment of the present invention a default host agent may also be listed within the host agent reference table for all destination nodes not explicitly listed within the table. Additionally, an ordered list of likely host agents may be established and utilized sequentially in a selected order for unlisted destination nodes, in response to a failure of a document to achieve a confirmation of delivery within a specified period of time.

7 Claims, 3 Drawing Sheets

HOST AGENT REFERENCE TABLE

| DESTINATION NODE | HOST AGENT |
|---|---|
| M5NVM1 | $DISOSS |
| M5NVM2 | $DISOSS |
| DALHQIC1 | $PROFS |
| DALHQIC2 | $PROFS |
| " | " |
| " | " |
| AUSVMV | $PROFS |
| DEFAULT | 1. $DISOSS<br>2. $PROFS<br>3. LANI.X. |

Fig. 2

METHOD AND APPARATUS FOR ENHANCED ELECTRONIC MAIL DISTRIBUTION

BACKGROUND OF THE INVENTION

1. Technical Field

The present invention relates in general to enhanced electronic communications within a distributed data processing system and in particular to a method and apparatus for expeditiously distributing electronic mail documents within a data processing system having multiple systems and external networks. Still more particularly, the present invention relates to an improved method and apparatus for distributing electronic mail documents from a user within a local network having a designated agent for communication with a particular system to recipients within multiple host systems and/or external networks.

2. Description of the Related Art

Electronic mail systems are rapidly supplanting traditional paper mail systems in the modern office. Large distributed data processing systems are often utilized to permit the rapid transmittal of electronic documents over large distances between thousands of enrolled system users. By utilizing such systems large amounts of data may be rapidly and accurately distributed throughout the data processing system.

Modern state-of-the-art data processing systems, such as CCITT's X.400, Office Vision VM and PROFS, both by International Business Machines Corporation, may all be utilized to distribute electronic documents to a large number of enrolled users. Such systems may also provide an indication of the delivery or non-delivery of an electronic mail item that may be obtained from the system.

As efficient as these modern systems are a problem exists when a user attempts to transmit an electronic mail document to another user without explicit knowledge of the most efficient routing which should be utilized to deliver the electronic mail documents. This is further complicated in systems such as the OV/2 Local Area Network (LAN) mail distribution systems which permits only a single agent to be defined for each mail user for communication with a particular host system or external network. This effectively limits the number of host gateways to one gateway per user on a Local Area Network. Those skilled in the art will appreciate that a Local Area Network (LAN) may have several gateways to multiple host systems; however, current implementations limit each user within a Local Area Network (LAN) to only one of these gateways for host connectivity. This system functions admirably when a user attempts to communicate with another user who is enrolled within the same host system or external network; however, manual intervention is often necessary to distribute an electronic document to a user who is not enrolled within the same host system or external network as the sending party.

It should therefore be apparent that a need exists for a method and apparatus which will permit a user to effectively utilize multiple host agents or external networks within a Local Area Network (LAN) mail distribution system, thereby providing efficient connectivity to multiple systems for electronic document distribution.

SUMMARY OF THE INVENTION

It is therefore one object of the present invention to provide an enhanced electronic communications system within a distributed data processing system.

It is another object of the present invention to provide a method and apparatus for expeditiously distributing electronic mail documents within a data processing system having multiple host systems or external networks therein.

It is yet another object of the present invention to provide an improved method and apparatus for distributing electronic mail documents for a user within a local network having a designated host agent to recipients within multiple host systems or external networks.

The foregoing objects are achieved as is now described. A distributed data processing system having multiple host systems and/or external networks is provided which permits electronic mail documents to be distributed from local networks to nodes within the various host systems or external networks. This is accomplished by establishing a host agent reference table at selected host agents within the local networks. Each host agent reference table includes an identification of selected destination nodes associated with an identified host agent for those nodes. A referral to the host agent reference table may then be utilized to determine the appropriate host agent for an electronic document destined for a selected node. Thereafter, existing interprocess local network communications may be utilized to communicate the electronic document to the appropriate host agent. In the depicted embodiment of the present invention a default host agent may also be listed within the host agent reference table for all destination nodes not explicitly listed within the table. Additionally, an ordered list of likely host agents may be established and utilized sequentially in a selected order for unlisted destination nodes in response to a failure of a document to achieve a confirmation of delivery within a specified period of time.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment widen read in conjunction with the accompanying drawings, wherein:

FIG. 2 is a pictorial representation of a host agent reference table which may be utilized to implement the method and apparatus of the present invention.

DETAILED DESCRIPTION OF PREFERRED EMBODIMENT

Figure 1:
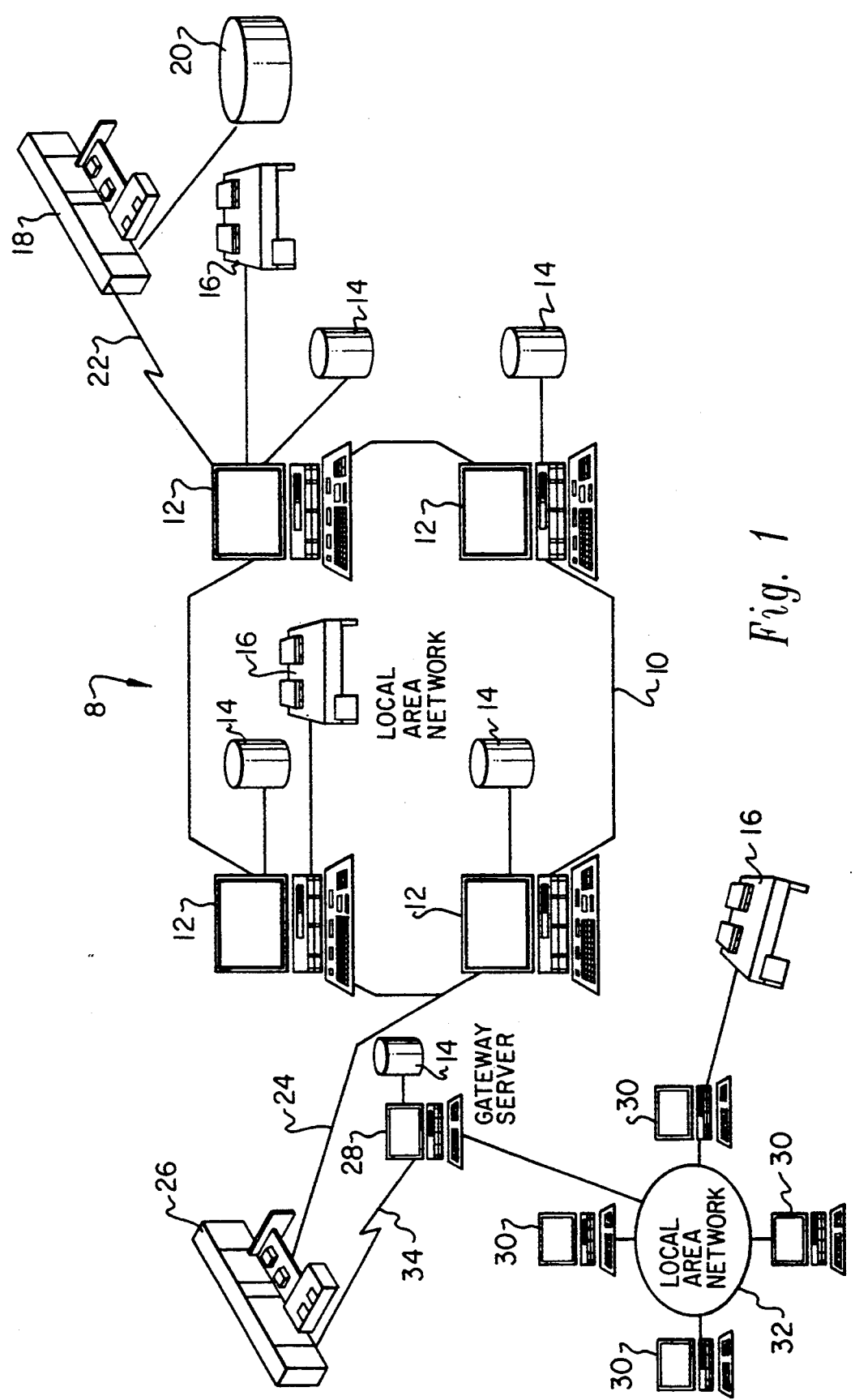
FIG. 1 is a pictorial representation of distributed data processing system which may be utilized to implement the method and apparatus of the present invention.

With reference now to the figures and in particular with reference to FIG. 1, there is depicted a pictorial representation of distributed data processing system 8 which may be utilized to implement the method and apparatus of the present invention. As may be seen, distributed data processing system 8 may include a plurality of local networks, such as Local Area Network (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network. Further, each network may be implemented utilizing various other types of networks available in the art, such as, for example, token-ring networks.

As is common in such data processing systems, each individual computer may be coupled to a storage device 14 and/or a printer/output device 16. One or more such storage devices 14 may be utilized in accordance with the method of the present invention, to store the host agent reference tables which may be periodically accessed and utilized to distribute electronic mail documents or other data objects within distributed data processing system S, in accordance with the method of the present invention. In a manner well known in the prior art, each such host agent reference table may be stored within a storage device 14 which is associated with a host agent server which is responsible for providing a host gateway for one or more users associated therewith.

Still referring to FIG. 1, it may be seen that data processing network 8 may also include multiple host systems which may be implemented utilizing mainframe computers, such as mainframe computer 18, which may be preferably coupled to Local Area Network (LAN) 10 by means of communications link 22. Mainframe computer 18 may also be coupled to a storage device 20 which may serve as remote storage for Local Area Network (LAN) 10. Local Area Network (LAN) 10 may also be coupled via mainframe computer 26 and communications link 34 to a gateway server 28. Gateway server 28 is preferably an individual computer or work station which serves to link Local Area Network (LAN) 32 to Local Area Network (LAN) 10 via a host system implemented utilizing mainframe computer 26.

Although distributed data processing system 8 is illustrated including two host systems and two local networks, such systems may typically include a large number of host systems and local networks, rendering communication between selected nodes a difficult procedure to implement. Further, those skilled in the art will appreciate that mainframe computer 18 may be located a great geographical distance from Local Area Network (LAN) 10 and similarly Local Area Network (LAN) 10 may be located a substantial distance from Local Area Network (LAN) 32. That is, Local Area Network (LAN) 32 may be located in California, while Local Area Network (LAN) 10 may be located within Texas and mainframe computer 18 may be located in New York.

As will be appreciated upon reference to the foregoing, it is often desirable for a user within one portion of distributed data processing network 8 to transmit a data object or electronic mail document to a user in another portion of distributed data processing network 8. Most Local Area Network (LAN) mail distribution systems permit an individual user within the Local Area Network (LAN) to define a "host agent" to act as a host gateway between that user and a host system or external networks for distribution of data objects or electronic mail documents to users within other portions of distributed data processing network 8. This effectively limits the number of host gateways to one host gateway per user on each local network However, a local network may include several gateways to different host systems, since each user may have a different host agent defined for that user.

Therefore, if a method and apparatus could be provided which could selectively utilize interprocess communications techniques to transmit a data object or electronic mail document to a particular host agent within the Local Area Network (LAN), communications to selected nodes within distributed data processing network 8 would be greatly enhanced.

Under current mail distribution systems each user is necessarily constrained to transmitting a data object or electronic mail document via the designated host agent and in those events wherein the destination node is unknown to the selected host system or external network, communications becomes much more difficult.

For example, still referring to FIG. 1, a user within Local Area Network (LAN) 10 having a designated host agent coupling that user to the host system resident within mainframe computer 18 will find communication between that user and a user within Local Area Network (LAN) 32 difficult to accomplish. In accordance with the method and apparatus of the present invention a host agent reference table is provided in association with a host agent server for a particular user within a network. The host agent reference table may then be utilized to direct the transmittal of a data object or electronic mail document utilizing existing interprocess communications within Local Area Network (LAN) 10 to a second host agent, which preferably serves as a host gateway to the host system resident within mainframe computer 26. Thereafter, the data object or electronic mail document may be efficiently transmitted to the desired user with Local Area Network (LAN) 32.

Referring now to FIG. 2, there is depicted a pictorial representation of a host agent reference table 50 which may be utilized to implement the method and apparatus of the present invention. Preferably, a host agent reference table, such as the table depicted within FIG. 2, is created and stored in conjunction with each host agent server within distributed data processing network 8. Contained within host agent reference table 50 is a destination node column 52 which includes a set of destination node identifiers which may be utilized, in a manner well known in the prior art, to characterize a particular node or group of nodes within distributed data processing system e.

Next, a host agent column 54 is provided and utilized in association with each destination node listed within destination node column 52 to designate a particular host agent server which is to be utilized for coupling data objects or electronic mail documents to a user at the selected node. Thus, for example, a data object or electronic mail document addressed to destination node M5NVM1 will thus be automatically coupled to host agent server $DISOSS. Similarly, a data object or electronic mail document addressed to a user at destination node DALHQIC2 will automatically be coupled to host agent $PROFS.

In this manner, by determining the destination node for a particular data object or electronic mail document coupled to a host agent from a user and thereafter referring to the host agent reference table associated with that host agent a selected host agent for that destination node may be determined. Thereafter, utilizing well known interprocess network communications techniques the data object or electronic mail document may be transmitted within the local network to the selected host agent and thereafter efficiently transmitted to the desired destination node.

Still referring to FIG. 2 in accordance with an important feature of the present invention, a default entry 56 is also illustrated. Default entry 56 is to be utilized for any destination node not listed within host agent reference table 50. In the event a data object or electronic mail document is receive at the host agent associated with host agent reference table 50 which includes a destination node which is not explicitly listed within host agent reference table 50, default entry 56 is utilized to access an ordered list of host agents 58 which represents a listing of all likely host agent servers which may be utilized to transmit a data object or electronic mail document; to an unlisted destination node.

Of course, those skilled in the art will appreciate that ordered list 58 of host agents is preferably arranged in a sequential order representing the likelihood that each listed host agent may be utilized to successfully complete the transmittal of the data object or electronic mail document. Thus, for a data object or electronic mail document which is addressed to a destination node not listed within host agent reference table 50, the host agent associated therewith will first attempt to transmit that data object or electronic mail document utilization host agent $DISOSS.

After failing to obtain a confirmation of delivery within a selected period of time, utilizing well known service level system functions as discussed above, the host agent will thereafter attempt to transmit the data object or electronic mail document utilizing host agent $PROFS. Similarly, after a failure of that attempt the data object or electronic mail document will be coupled to host agent LAN1.*.. In this manner, a system operator may customize an ordered list of host agents for selected host agent reference tables within distributed data processing system 8 based upon experience and the likelihood that transmission of a data object or electronic mail document may be successfully completed utilizing each of those host agents.

Figure 3:
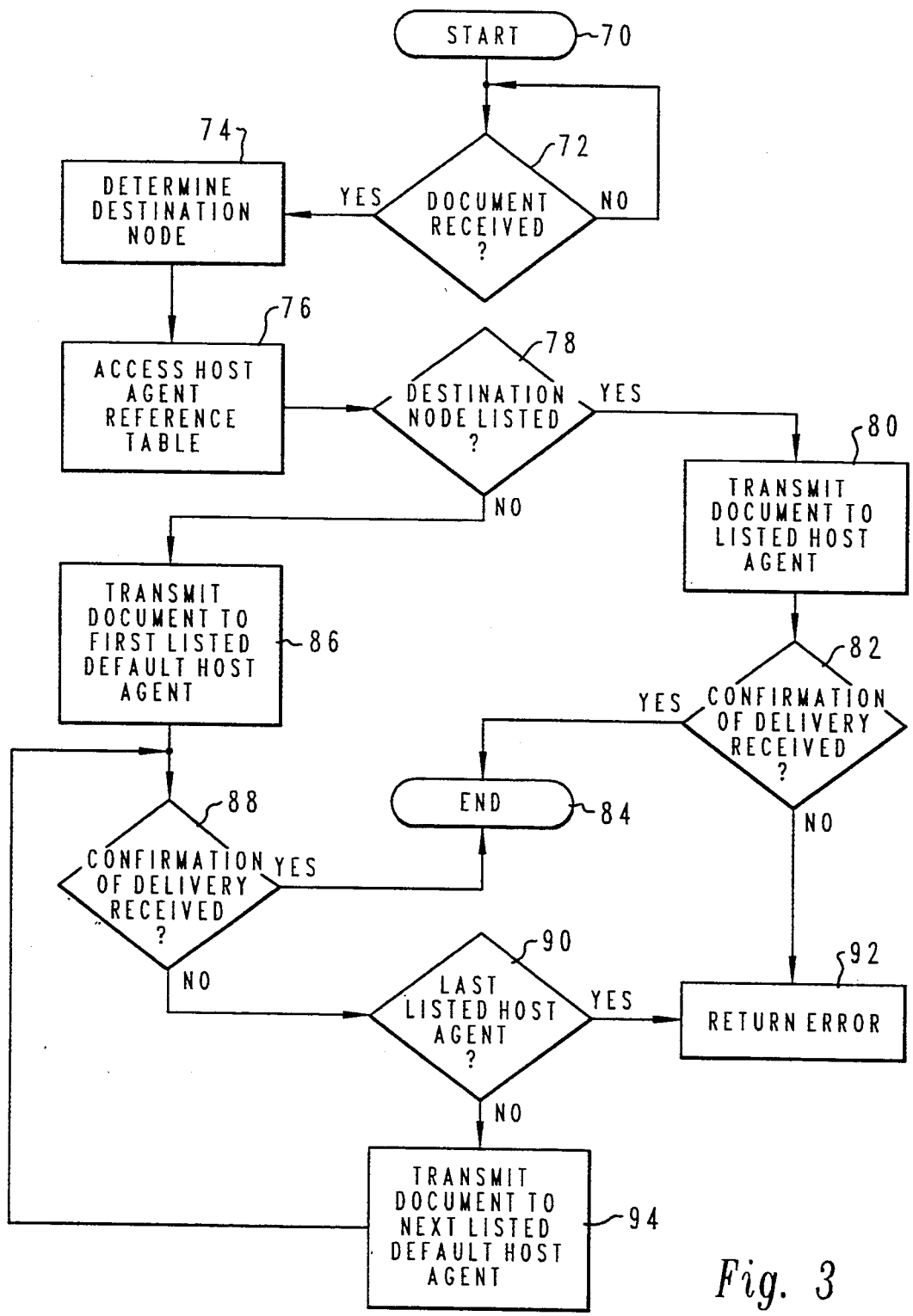
FIG. 3 is logic flow chart illustrating the distribution of electronic mail documents utilizing the method and apparatus of the present invention.

With reference now to FIG. 3, there is depicted a logic flow chart illustrating the distribution of a data object or electronic mail document utilizing the method and apparatus of the present invention. As illustrated, the process begins at block 70 and thereafter passes to block 72 which depicts a determination of whether or not a document has been received at a selected host agent within distributed data processing network 8. If not, the process merely iterates until such time as a document has been received. In the event a document is received at a host agent server within distributed data processing network 8, the process then passes to block 74 which illustrates a determination of the destination node for the document in question. Thereafter, the process passes to block 76 which depicts the accessing of a host agent reference table, such as the host agent reference table depicted within FIG. 2.

Next, the process passes to block 78 which illustrates a determination of whether or not the destination node for the received document is listed within the host agent reference table. If so, the process passes to block 80 which illustrates the transmittal of that document to the listed host agent, utilizing traditional interprocess communication techniques. Thereafter, block 82 depicts a determination of whether or not a confirmation of delivery of that document to the destination node has been received. If so, the process passes to block 84 and terminates. In the event a confirmation of delivery at the destination node is not received within a selected period of time, the process passes from block 82 to block 92 which illustrates the returning of an error message.

Referring again to block 78, in the event the reference to the host agent reference table finds that the destination node is not listed therein, the process passes to block 86 which depicts the transmittal of the document to the first listed default host agent. Thereafter, the process passes to block 88 which depicts a determination of whether or not a confirmation of delivery has been received, indicating that the document has been successfully transmitted to the destination node. In the event a confirmation of delivery has been received, the process again passes to block 84 and terminates.

Referring again to block 88, in the event a confirmation of delivery of the document to the selected destination node is not received within a selected period of time, the process passes to block 90. Block 90 illustrates a determination of whether or not the default host agent to which the document was transmitted was the last listed host agent within the list of default host agents. If so, the process passes to block 92 and returns an error message.

However, in the event the host agent to which the document was transmitted is not the last listed host agent within the default host agent list the process passes to block 94. Block 94 illustrates the transmittal of the document to the next listed default host agent and the process then returns to block 88 to await confirmation of a successful delivery or the elapse of a selected period of time, indicating that delivery has not successfully occurred.

Upon reference to the foregoing those skilled in the art will appreciate that the Applicants in the present application have provided a method and apparatus whereby data objects or electronic mail documents may be expeditiously transmitted to selected nodes within a data processing system, despite the fact that the destination node may not form a part of the host system or network to which a transmitting user is connected. As utilized herein, the term "host system" shall include external networks coupled to a distributed data processing system.

By providing a novel host agent reference table at selected host agents within the distributed data processing network, data objects or electronic mail documents may be automatically forwarded to a specific host agent identified within that table for the purpose of transmitting data objects or electronic mail documents to a selected destination node.

Further, in order to avoid the necessity of assigning every single node within a distributed data processing network to a corresponding host agent, the method and apparatus of the present invention efficiently permits the transmittal of data objects or electronic mail documents to a sequentially ordered list of host agents for all those nodes not explicitly listed within a host agent reference table.

Similarly, those skilled in the art will appreciate that large groups of nodes may be efficiently listed by utilizing the well known expedient of substituting a generic character, indicating a "don't care" state, for one or more characters within a node identification. For example, a listing of DAL* may be utilized for all nodes including any characters following the character string "DAL." Alternatively, a listing of *HQ* could be utilized for all nodes having characters preceding and following the character string *HQ*. In this manner whole groups of nodes may be efficiently identified for distribution in accordance with the method of the present invention.

While the invention has been particularly shown and described with reference to a preferred embodiment, it will be understood by those skilled in the art that various changes in form and detail may be made therein without departing from the spirit and scope of the invention.

We claim:

1. A method for enhanced electronic mail document distribution to selected nodes within a distributed data processing system having a plurality of host systems and at least one network comprising a plurality of users, each of said plurality of users having a selected host agent coupling a user to a predetermined one of said plurality of host systems, said method comprising the steps of:

establishing a host agent reference table in association with a host agent, said host agent reference table identifying alternate host agents serving particular node destinations within alternate ones of said plurality of host systems within said distributed data processing system;

determining a node destination address for a selected electronic mail document coupled from a user to a particular host agent;

in the event said node destination address is unknown to said particular host agent, determining a selected one of said alternate host agents serving said node destination address in response to a reference to said host agent reference table;

automatically coupling said selected electronic mail document to said selected one of said alternate host agents; and thereafter utilizing said selected one of said alternate host agents to deliver said selected electronic mail document to said node destination address.

2. The method for enhanced electronic mail document distribution to selected nodes within a distributed data processing system according to claim 1, wherein said step of establishing at least one host agent reference table identifying alternate host agents serving particular node destinations alternate ones of said plurality of host systems within said distributed data processing system further comprises the step of identifying a selected one of said alternate host agents for utilization with any node destination not listed within said host agent reference table.

3. The method for enhanced electronic mail document distribution to selected nodes within a distributed data processing system according to claim 2, wherein said step of identifying a selected one of said alternate host agents for utilization with any node destination not listed within said host agent reference table further comprises the step of identifying an ordered list of host agents among said alternate host agents to be utilized in a selected order with any node destination not listed within said host agent reference table.

4. The method for enhanced electronic mail document distribution to selected nodes within a distributed data processing system according to claim 3, wherein said step of identifying an ordered list of alternate host agents to be utilized in a selected order with any node destination not listed within said host agent reference table further comprises the step of utilizing each successive host agent within said ordered list of alternate host agents in a selected order in response to a failure of said selected electronic mail document to achieve a confirmation of delivery.

5. A distributed data processing network for the efficient distribution of electronic mail documents to selected nodes within said distributed data processing network, said distributed data processing network comprising:

a plurality of host systems;

at least one network comprising a plurality of users, each of said plurality of users having a selected host agent coupling a user to a particular host system;

a host agent reference table identifying alternate host agents serving particular node destinations within alternate ones of said plurality of host systems within said data processing network;

distribution means for determining a node destination address for a selected electronic mail document coupled from a user to a particular host agent;

control means for determining a selected one of said alternate host agents serving said node destination address in response to a reference to said host agent reference table in the event said node destination address is unknown to said particular host agent;

communication means for automatically coupling said selected electronic mail document to said selected one of said alternate host agent; and communication means for thereafter utilizing said selected one of said alternate host agents to deliver said selected electronic mail document to said node destination address.

6. The distributed data processing network for the efficient distribution of electronic mail documents to selected nodes within said distributed data processing network according to claim 5, wherein said host agent reference table also includes an identification of a selected one of said alternate host agents to be utilized with any node not listed within said host agent reference table.

7. The distributed data processing network for the efficient distribution of electronic mail documents to selected nodes within said distributed data processing network according to claim 5, wherein said host agent reference table also includes an identification of an ordered list of alternate host agents to be utilized in a selected order with any node not listed within said host agent reference table.

* * * * *

UNITED STATES PATENT AND TRADEMARK OFFICE
CERTIFICATE OF CORRECTION

PATENT NO. : 5,424,724
DATED : June 13, 1995
INVENTOR(S) : Williams et al.

It is certified that error appears in the above-indentified patent and that said Letters Patent is hereby corrected as shown below:

In column 2, line 48, please change "widen" to --when--.

In column 3, line 17, please change "S" to --8--.

In column 4, line 47, please change "e" to --8--.

In column 5, line 8, please change "receive" to --received--.

Signed and Sealed this

Sixteenth Day of April, 1996

Attest:

BRUCE LEHMAN

Attesting Officer

Commissioner of Patents and Trademarks